United States Patent
Motti et al.

(10) Patent No.: US 6,319,011 B1
(45) Date of Patent: Nov. 20, 2001

(54) AUTOMATIC TRAINING DEFIBRILLATOR SIMULATOR AND METHOD

(76) Inventors: Michael J. Motti, P.O. Box 2146; Randy E Berlin, P.O. Box 1653; James Paul Revard, P.O. Box 1765, all of Sitka, AK (US) 99835

( * ) Notice: Subject to any disclaimer, the term of this patent is extended or adjusted under 35 U.S.C. 154(b) by 0 days.

(21) Appl. No.: 08/418,579
(22) Filed: Apr. 6, 1995
(51) Int. Cl.$^7$ ................................................ G09B 23/28
(52) U.S. Cl. .................... 434/262; 434/265; 434/267; 607/4; 607/5; 607/6; 607/7
(58) Field of Search .................... 434/262, 265, 434/267; 607/4–7

(56) References Cited

U.S. PATENT DOCUMENTS

| | | | |
|---|---|---|---|
| 4,583,524 | * 4/1986 | Hutchins ........................ | 434/265 X |
| 4,588,383 | * 5/1986 | Parker et al. .................... | 434/265 |
| 4,610,254 | * 9/1986 | Morgan et al. .................. | 607/6 |
| 4,850,356 | * 7/1989 | Heath ............................. | 607/5 |
| 4,863,385 | * 9/1989 | Pierce ............................ | 434/265 |
| 5,088,037 | * 2/1992 | Battaglia ....................... | 434/265 X |
| 5,391,187 | * 2/1995 | Freeman ......................... | 607/5 |
| 5,394,892 | * 3/1995 | Kenny et al. .................. | 434/265 X |
| 5,611,815 | * 3/1997 | Cole et al. ..................... | 607/5 |

* cited by examiner

*Primary Examiner*—Valencia Martin-Wallace
*Assistant Examiner*—Chandra Harris

(57) ABSTRACT

The instant invention provides an apparatus, and a method of its use, for enabling an instructor to train a student in learning a procedure which embodies at least two alternative sequences of steps and conditions. The invention, in order, enables the student to initiate the procedure; enables communication of at least one condition or an instruction required for prompting the student to initiate at least one step following in the sequence, at a time, to the student; enables the instructor to provide an alternative sequence; and, enables the student to initiate at least one step of said procedure in response to said alternative sequence.

14 Claims, 2 Drawing Sheets

AUTOMATIC TRAINING DEFIBRILLATOR SIMULATOR AND METHOD

BACKGROUND OF THE INVENTION

Although the instant invention has broad application to substantially any control system by which an instructor can manually generate an educational signal to prompt a response in a subject, it will be described herein with particular reference to an automatic external defibrillator simulator, the preferred species of the invention's broadest application.

DESCRIPTION OF THE PRIOR ART

Emergency treatment of cardiac anomalies which may involve defibrillation or the oversight of the electrical activity of a patient's heart imposes a great stress on attendant medical and/or paramedical personnel. The patient's life may well depend on the speed and accuracy by which such personnel perform their skills. A typical sequence of steps first includes the attachment of the cable leads from a defibrillator/monitor to electrode pads, and then the application of the electrode pads to the patient's chest.

A first conventional placement pattern is referred to, as the anterior/anterior arrangement. Here, one pad is positioned lateral to the upper sternum and below the right clavicle, while the other pad is positioned on the patient's lower left chest, below and lateral to the cardiac apex.

A second conventional pattern is referred to as the anterior/posterior arrangement. Here, the anterior pad is positioned over the precordium, while the posterior pad is positioned on the patient's back, behind the heart.

It should thus be appreciated that proper placement of the pads is a critical factor in the successful achievement of defibrillation. Once the pads are properly placed according to either of the foregoing conventional patterns, the attendant must then use the defibrillator monitor to display and interpret the patient's electrocardiogram ("ECG"), and if indicated, apply a pulse of energy to the patient's heart to achieve defibrillation.

Although, at first blush, the above described procedure might appear simple and forthright, the emergency conditions under which it is typically performed can subject it to human error. Thus there is a long felt need for a simple and efficient means by which emergency personnel can be thoroughly trained in all aspects of the procedure.

U.S. Pat. No. 5,275,572, discloses a training electrode for use in training emergency personnel in electrocardiogram defibrillation and monitoring.

U.S. Pat. No. 5,137,458, teaches a defibrillation training system for use in training individuals in the proper positioning of defibrillation electrodes on a patient.

U.S. Pat. No. 4,360,345, discloses a computer controlled interactive health instruction system.

U.S. Pat. No. 3,662,076, shows a training mannikin for use in simulating various cardiac conditions in the human body.

To the extent that the foregoing prior art is pertinent to the instant invention, it shows that a long felt need exists for a simple, relatively low cost, device which enables an instructor to teach automated external defibrillation to a student.

BRIEF SUMMARY OF THE INVENTION

The invention as hereafter described, provides an apparatus, and a method of its use, for enabling an instructor to train a student in learning a procedure which embodies at least two alternative sequences of steps and conditions. In the following order, the invention: (a) enables the student to initiate the procedure; (b) enables communication by: (i) an automated audio voice message, (ii) a light emitting diode, or (iii) a lightable indicia, of at least one condition or instruction required for prompting the student to initiate at least one step which follows in the sequence to the student, at a time; (c) enables the instructor to provide alternative steps or conditions in the sequence; and, (d) enables the student to initiate at least one step of the procedure in response to the instructor's alteration of the procedure. Although not specifically limited thereto, the invention will hereafter be specifically illustrated with regard to performing automated external defibrillation procedure on a mock patient.

DETAILED DESCRIPTION OF THE INVENTION

Figure 1:
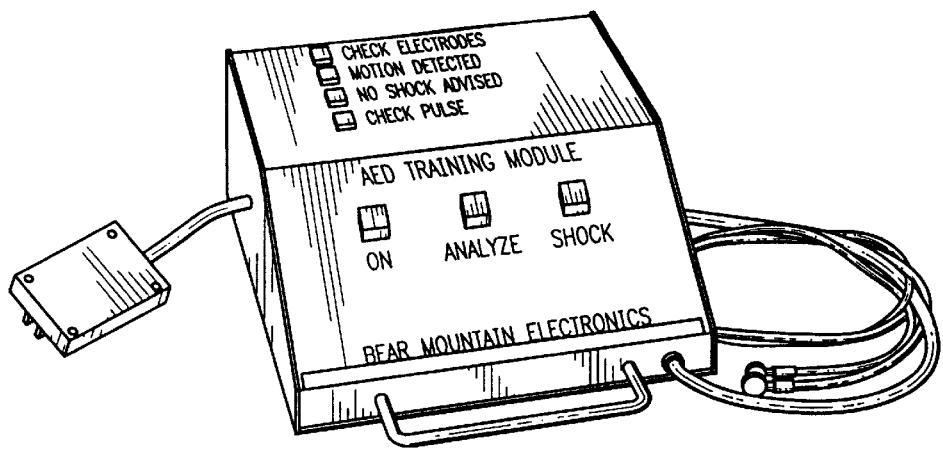
FIG. 1 shows a photograph of the instant apparatus showing the "ON," "ANALYZE," and "SHOCK" switches, and "CHECK ELECTRODES," "MOTION DETECTED," "NO SHOCK ADVISED," and "CHECK PULSE" instruction indicia.

Referring to FIG. 1, the apparatus includes three switches labeled "ON," "ANALYZE," and "SHOCK," respectively; and means for communicating the following four instructions or conditions to the student: (a) check the electrodes on the mock patient, (b) motion is detected in the mock patient, (c) no shock to the mock patient is advised, and (d) check the pulse of the mock patient, respectively. An automated audio voice message, light emitting diodes, or lightable indicia, can be used as the means for communicating the instruction or condition to the student.

Figure 2:
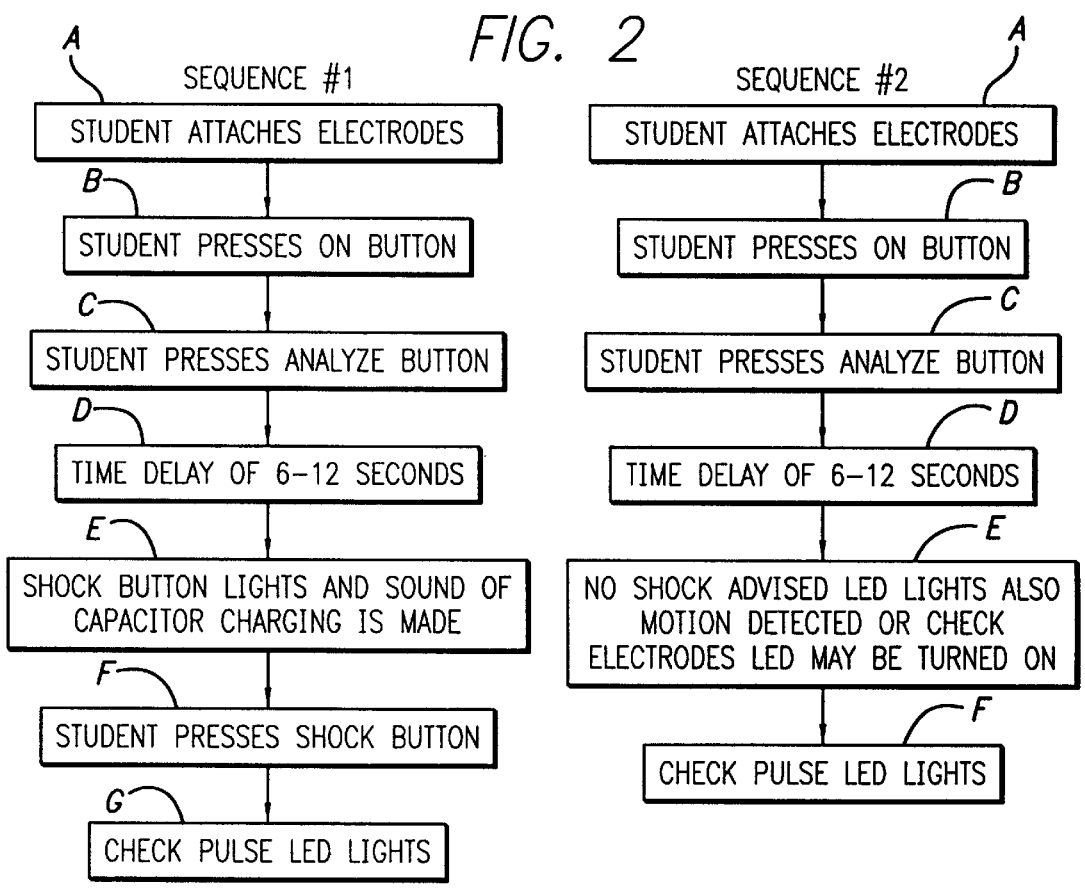
FIG. 2 shows a flows chart which illustrates two alternative sequential modes of instruction.

In reference to FIG. 2, the invention further contemplates a first alternative sequence of steps in which the apparatus of the invention can be manipulated: (a) the student attaches the electrodes to the mock patient, (b) the student is instructed to engage the switch labeled "ON," (c) the student is instructed to engage the switch labeled "ANALYZE," (d) the instructor enables a time delay in the procedure of about Six (6) to Twelve (12) seconds, (e) the student is instructed that a shock to the mock patient is not advised, (f) the student is instructed to engage the switch labeled "SHOCK," and finally, (g) the student is instructed to check the pulse of the mock patient. The apparatus of the invention can still further be manipulated to provide a second alternative sequence of training steps: (a) the student is instructed to engage the switch labeled "ON," (b) the student is instructed to engage the switch labeled "ANALYZE," (c) the instructor enables a time delay in the procedure of about Six (6) to Twelve (12) seconds, (d) the student is instructed that a shock to the mock patient is not advised, (e) the student is advised that motion has been detected in the mock patient, and to check the electrodes on the mock patient, and that no shock to the mock patient is advised, and (f) the student is instructed to check the pulse of the mock patient.

Figure 3:
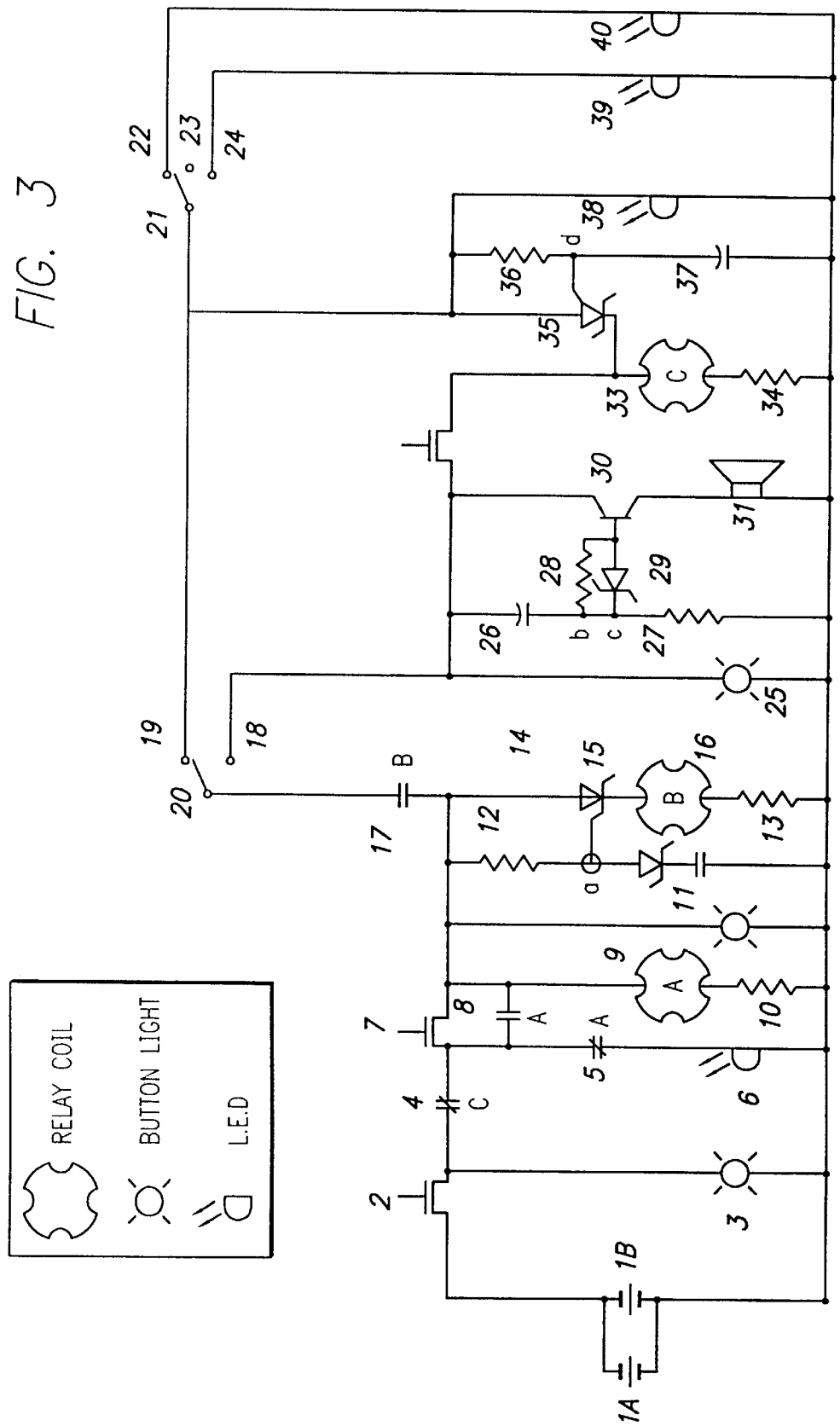
FIG. 3 shows the circuit diagram of the apparatus of the instant invention.

FIG. 3 shows a circuit diagram as applied to a device for instructing automatic external defibrillation. Table No. 1 shows all components of the circuit diagram, including typical values and identification, where applicable:

TABLE 1

| DRAWING NUMBER | TYPICAL VALUE (WHERE APPLICABLE) | COMPONENT DESCRIPTION |
| --- | --- | --- |
| 1a,b |  | 9 volt battery |
| 2 |  | ON/OFF switch |
| 3 |  | ON lamp |
|  |  | Relay C |
| 4 |  | Normally closed contacts |
| 33 |  | Coil |
|  |  | RELAY A |
| 5 |  | Normally closed contacts |
| 8 |  | Normally open contacts |
| 9 |  | Coil |
| 7 |  | Analyze switch |
| 10 | 100 Ohms | Resistor |
| 11 |  | Analyze lamp |
| 12 | 300 K Ohms | Resistor (RC time constant 1) |
| 13 |  | Capacitor (RC time constant 1) |
| 14 |  | Silicon oontrolled rectifier |
|  |  | RELAY B |
| 17 |  | Normally open contacts |
| 15 |  | Coil |
| 16 | 100 Ohms | Resistor |
| 20 |  | SHOCK ADVISED/ NO SHOCK ADVISED SWITCH |
| 18 |  | Shock advised contact |
| 19 |  | No shock advised contact |
| 21 |  | OPTION SWITCH |
| 24 |  | Motion detected contact |
| 22 |  | Check electrodes contact |
| 23 |  | Neither LEDs contact |
| 25 |  | Shock lamp |
| 26 |  | Capacitor (RC time constant 2) |
| 27 | 10 K Ohms | Resistor (RC time constant 2) |
| 28 | 1 Meg Ohms | Resistor |
| 31 |  | Speaker |
| 32 |  | Shock switch |
| 34 | 100 Ohms | Resistor |
| 35 |  | Silicon control rectifier |
| 36 | 500 K Ohms | Resistor (RC time constant 3) |
| 37 |  | Capacitor (RC time constant 3) |
| 38 |  | No shock LED |
| 39 |  | Motion detected LED |
| 40 |  | Check electrodes LED |

The operation of the circuit shown in FIG. 3, can be described by the following steps of its operation:

The "OFF" Position

The Two (2)-Nine (9) volt batteries 1a, 1b, are arranged in parallel with each other and are in series with the ON/OFF Switch 2. When the ON/OFF switch is placed in the "OFF" position, the circuit is open.

The "ON" Position

The ON/OFF switch 2 is a DPDT, lighted latching type switch. Typically, when it is turned to the "ON" position, the circuit portion defined by: batteries 1a, 1b; switch 2; ON/OFF lamp 3; normally closed contacts 5 of relay A; and "CHECK PULSE" LED 6 is completed, thus causing the ON/OFF lamp 3 and the "CHECK PULSE" LED to become lighted.

The "ANALYZE" Position

The "ANALYZE" switch 7 is a SPST type momentary switch. When it is depressed, the circuit portion defined by: analyze switch 7; normally open contacts 8 of relay A; the coil 9 of relay A; resistor 10; "ANALYZE" lamp 11; resistor 12; capacitor 13; silicon controlled rectifier 14; coil 15 of relay B; and resistor 16 is completed in connection with the previously "ON" position circuit portion, thus causing the "ANALYZE" switch 7 to become closed; the normally closed contacts 5 of relay A to become open, thereby extinguishing the "CHECK PULSE" LED 6 and lighting the "ANALYZE" lamp 11. In addition, the RC time constant 1 circuit defined by resistor 12 and capacitor 13 is completed and the voltage across node A is caused to ramp-up. A voltage potential is created across the normally open contacts of relay B, 17, and at the anode of silicon controlled rectifier 14 which is initially in the "OFF" position. When the voltage at node A reaches approximately Five (5) volts (approximately Ten (10) seconds), the gate of the silicon controlled rectifier 14 causes the rectifier to be turned on, thereby completing the circuit to the coil of relay B, 15, and thereby closing the normally open contacts of relay B, 17.

The "SHOCK ADVISED" SWITCH (POSITION "A")

When the circuit is completed across the coil of relay B, 15 and the normally open contacts of relay B, 17 are closed, as previously described, with the "SHOCK ADVISED/NO SHOCK ADVISED" 20 (a DPST switch), in the "SHOCK ADVISED" position 18, the circuit defined by: "SHOCK ADVISED" LED 25, capacitor 26, resistor 27, resistor 28, Zenner diode 29, transistor 30 and speaker 31, is completed. When this portion of the circuit is completed by engagement of the "SHOCK ADVISED" switch (position 20-18), the "SHOCK" button lamp 25 is caused to light; the RC time constant 2 circuit, defined by resistor 27 and capacitor 26 is completed and voltage begins to ramp up at nodes B and C, thereby completing the circuit portion across transistor 30, resistor 28 and RC time circuit 26, 27, at node B, thereby causing speaker 31 to emit a ramping, low tone. When the ramping voltage reaches approximately Five (5) volts (approximately Ten (10) seconds), the circuit portion across the Zenner diode 29, connected to the RC time circuit 26, 27, at node C breaks down causing transistor 30 to drive speaker 31 to a louder and higher pitch.

The "SHOCK" Button

The audio speaker tone and the visual lighted "SHOCK" button lamp, both prompt the student to depress the "SHOCK" button 32, a SPST switch, thereby completing the circuit defined by the coil 33 of relay C and resistor 34, and thereby causing the normally closed contacts of relay C, 4 to open momentarily; thus interrupting the circuit at that point and resetting and completing that portion of the circuit which includes the ON/OFF switch, the "ON" lamp 3 and the "CHECK PULSE" LED 6, thereby causing them to become lit.

The "SHOCK ADVISED" Switch (Position "B")

When the normally open contacts of relay B, 17, are caused to close due to the completion of the circuit across the coil of relay B, 15 and the positioning of the "SHOCK ADVISED/NO SHOCK ADVISED" switch 20 to the "NO SHOCK" position 19, the circuit portion defined by: option switch 21, silicon controlled rectifier 35, resistor 36, capacitor 37, "NO SHOCK ADVISED" LED 38 is either completed or not, depending on the position of option switch 21. When it is engaged so as to complete the circuit, the "MOTION DETECTED" LED 39 and the "CHECK ELECTRODE" LED are both caused to become lighted. When this portion of the circuit is completed, voltage is established across the anode of the silicon controlled rectifier 35, and the RC time constant 3 circuit defined by resistor 35 and capacitor 37 and the voltage is caused to ramp up at node D.

The "NO SHOCK ADVISED" Led is Lit

As above noted, when the option switch 21 is caused to complete the circuit of which it is a part, the "MOTION DETECTED" LED and the "MOTION DETECTED" LED are caused to become lighted. When the option switch is caused to break the circuit of which it is a part, then neither LED is caused to become lighted. When the RC time constant circuit 36, 37 voltages reaches approximately Five (5) volts (approximately Ten (10) seconds) at node D, a sufficient voltage is established across the silicon controlled rectifier 35 to cause the circuit across the coil of relay C, 33, to be completed thereby causing the normally closed contacts of relay C, 4, to open momentarily, thereby breaking the circuit at that point but resetting the circuit defined by the "ON/OFF" switch, the "ON" lamp, the "CHECK PULSE" LED, thereby causing the latter two LEDs to become lighted.

Preferred values of individual circuit components include but are not necessarily limited to: all capacitors are typically 200μ farads; all relays are typically Hamlin (trademark) HE3321 C0500; the speaker is typically a Mallory (trademark) MSR320.

Although the invention has been described with reference to certain preferred embodiments, it will be appreciated that many variations and modifications my be made within the scope of the broad principles of the invention. Hence, it is intended that the preferred embodiments and all of such variations and modifications be included within the scope and spirit of the invention, as defined by the following claims.

What is claimed is:

1. An automatic defibrillator simulator for enabling an instructor to train a subject in learning steps and conditions of a simulated defibrillation procedure while eliminating any danger of electrical shock to said subject otherwise incidental to a working automatic defibrillator, comprising:

means for enabling said subject to initiate the first, through a sequence of steps of said simulated defibrillation procedure;

means for communicating to said subject, at least one of a plurality of conditions and instructions incidental to defibrillation training and required for prompting said subject to initiate at least one step at a time following in said sequence;

means for enabling said instructor to provide a different alternative sequence of said plurality; and, means for enabling said subject to initiate at least one step of said procedure in response to a condition of said different alternative sequence.

2. The apparatus of claim 1 wherein said procedure is automated external defibrillation performed on a mock patient.

3. The apparatus of claim 2, wherein said means for communicating is selected from the group consisting of: (a) an automated audio voice message, (b) a light emitting diode, (c) a lightable indicia and (d) an audible signal or alarm.

4. The apparatus of claim 3, wherein said procedure includes two alternative sequences.

5. The apparatus of claim 4, further including three switches labeled "ON," "ANALYZE," and "SHOCK," respectively, and four means for sequentially communicating instructions to said subject, including: (a) means for instructing said subject to check the electrodes on the mock patient, (b) means for instructing said subject that motion is detected in the mock patient, (c) means for instructing said subject that no shock to the mock patient is advised, and (d) means for instructing said subject to check the pulse of the mock patient.

6. The apparatus of claim 5, wherein said apparatus further includes means for providing a first alternative mode of sequential steps and conditions wherein: (a) said subject engages the switch labeled "ON," (b) said subject engages the switch labeled "ANALYZE," (c) said instructor enables a time delay in said procedure of about Six (6) to about Twelve (12) seconds, (d) said subject is instructed that a shock to said mock patient is not advised, (e) said subject is instructed to engage the switch labeled "SHOCK," and (f) said subject is instructed to check the pulse of said mock patient.

7. The apparatus of claim 5, wherein said apparatus further includes means for providing a second alternative mode of sequential steps and conditions wherein: (a) said subject engages the switch labeled "ON," (b) said subject engages the switch labeled "ANALYZE," (c) said instructor enables a time delay in said procedure of about Six (6) to about Twelve (12) seconds, (d) said subject is instructed that a shock to said mock patient is advised, (e) said subject is instructed that motion is detected in said mock patient, to check the electrodes on said mock patient, and that no shock to said mock patient is advised, and (f) said subject is instructed to check the pulse of said mock patient.

8. A method for enabling an instructor to train a subject in learning steps and conditions of a defibrillation procedure while eliminating any danger of electrical shock to said subject otherwise incidental to a working automatic defibrillator, through a sequence of steps, comprising:

providing an automatic defibrillator simulator, including:
means for enabling said subject to initiate the first step of said procedure;
means for communicating to said subject, at least one of a plurality of conditions and instructions incidental to defibrillation training and required for prompting said subject to initiate at least one step at a time following in said sequence;
means for enabling said instructor to provide a different alternative sequence of said plurality; and,
means for enabling said subject to initiate at least one step of said procedure in response to a condition of said different alternative sequence.

9. The method of claim 8 wherein said procedure is automated external defibrillation performed on a mock patient.

10. The method of claim 9, wherein said means for communicating is selected from the group consisting of: (a) an automated audio voice message, (b) a light emitting diode, (c) a lightable indicia and (d) an audible signal or alarm.

11. The method of claim 10, wherein said procedure includes two alternative sequences.

12. The method of claim 11, wherein said apparatus includes three switches labeled "ON," "ANALYZE," and "SHOCK," respectively, and four means for communicating to the subject: (a) to check the electrodes on the mock patient, (b) that motion is detected in the mock patient, (c) that no shock to the mock patient is advised, and (d) to check the pulse of the mock patient, respectively.

13. The method of claim 12, further including a first alternative sequence of steps and conditions, wherein: (a)

said subject engages the switch labeled "ON," (b) said subject engages the switch labeled "ANALYZE," (c) said instructor enables a time delay in said procedure of about Six (6) to about Twelve (12) seconds, (d) said subject is instructed that a shock to said mock patient is advised, (e) said subject is instructed to engage the switch labeled "SHOCK," and (f) said subject is instructed to check the pulse of said mock patient.

14. The method of claim 12, further including a second alternative sequence of steps and conditions, wherein: (a) said subject engages the switch labeled "ON," (b) said subject engages the switch labeled "ANALYZE," (c) said instructor enables a time delay in said procedure of about Six (6) to about Twelve (12) seconds, (d) said subject is instructed that a shock to said mock patient is advised, (e) said subject is instructed that motion is detected in said mock patient, to check the electrodes on said mock patient, and that no shock to said mock patient is advised, and (f) said subject is instructed to check the pulse of said mock patient.

* * * * *